United States Patent [19]

Henzl et al.

[11] 3,883,662

[45] May 13, 1975

[54] METHOD FOR DELAYING THE ONSET OF, OR POSTPONING, PARTURITION

[75] Inventors: Milan R. Henzl, Palo Alto; Adolph P. Roszkowski, Saratoga, both of Calif.

[73] Assignee: Syntex Corporation, Panama, Panama

[22] Filed: Mar. 29, 1973

[21] Appl. No.: 345,879

[52] U.S. Cl. .............................. 424/333; 424/343
[51] Int. Cl. ....................................... A61K 27/00
[58] Field of Search ........................... 424/343, 333

[56] References Cited
UNITED STATES PATENTS
3,792,167   2/1974   Fried et al. ..................... 424/343

OTHER PUBLICATIONS

Lematre et al., Bull. Soc. Chim. Fran., Ser. 5, Nov.–Dec. 1968, pages 4953–4958.

*Primary Examiner*—Sam Rosen
*Attorney, Agent, or Firm*—Joseph I. Hirsch; William B. Walker

[57] ABSTRACT

This invention relates to the administration of 2-(6-substituted-2-naphthyl)alkanols and aldehydes, and esters thereof, to pregnant mammals for delaying the onset of, or postponing, parturition.

10 Claims, No Drawings

METHOD FOR DELAYING THE ONSET OF, OR POSTPONING, PARTURITION

BRIEF SUMMARY OF THE INVENTION

This invention relates to the use of 2-(6-substituted-2-naphthyl)alkanols and aldehydes, and esters thereof, as agents for maintaining pregnancy in mammals until such time as parturition is medically considered to be favorable for the mother and/or the fetus. More particularly, this invention relates to the use of such compounds as agents for delaying the onset of, or postponing, parturition.

The compounds useful in this invention are represented by the following formula:

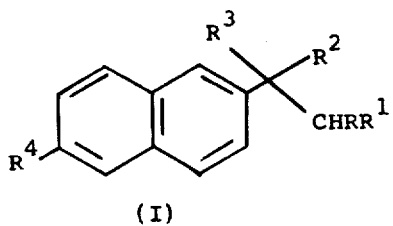

(I)

wherein, R is hydrogen and $R^1$ is hydroxy or a conventional hydrolyzable ester thereof, tetrahydrofuran-2'-yloxy, tetrahydropyran-2'-yloxy, 4'-alkoxytetrahydropyran-4'-yloxy; or R and $R^1$ together form =O, ethylenedioxy or 1',2'-propylenedioxy;

One of $R^2$ and $R^3$ is hydrogen, the other is hydrogen, methyl, ethyl or difluoromethyl; or $R^2$ and $R^3$ taken together are methylene, halomethylene or ethylene; and $R^4$ is alkyl, cycloalkyl, trifluoromethyl, vinyl, ethynyl, fluoro, chloro, alkoxy, alkoxymethyloxy, difluoromethoxy, alkylthio, alkoxymethylthio, or difluoromethylthio.

The term "alkyl" refers to and includes lower molecular weight, branched or straight chain hydrocarbon groups of 6 or less carbon atoms, such as methyl, ethyl, propyl, isopropyl, butyl, tertiarybutyl, pentyl, hexyl, and the like. The term "cycloalkyl" refers to cyclic hydrocarbon groups of 3 to 7 carbon atoms, such as cyclopropyl, cyclopentyl, cyclohexyl and the like.

The term "alkoxy" refers to a straight or branched chain hydrocarbon ether group of 6 or less carbon atoms, including methoxy, ethoxy, 2-propoxy, propoxy, butoxy, 3-pentoxy, and the like. The term "alkoxymethyloxy" refers to methylether groups substituted with one alkoxy group; typical alkoxymethyloxy groups include methoxymethyloxy, ethoxymethyloxy, isopropoxymethyloxy, and the like. The term "alkylthio" refers to straight or branched chain hydrocarbon thioether groups of 6 or less carbon atoms, including methylthio, ethylthio, propylthio, 2-propylthio, 2-butylthio, pentylthio, 3-hexylthio, and the like. The term "alkoxymethylthio" refers to methylthio ether groups substituted with one alkoxy group, such as methoxymethylthio, ethoxymethylthio, 2-propoxymethylthio, and the like.

The term "halomethylene" refers to mono- or dihalomethylene groups wherein halo is fluoro or chloro, such as include fluoromethylene, difluoromethylene, fluorochloromethylene, and chloromethylene.

The term "conventional hydrolyzable ester," as used herein, denotes those hydrolyzable ester groups conventionally employed in the art, preferably those derived from hydrocarbon carboxylic acids or their salts. The term "hydro-carbon carboxylic acid" defines both substituted and unsubstituted hydrocarbon carboxylic acids. These acids can be completely saturated or possess varying degrees of unsaturation (including aromatic), can be of straight chain, branched chain, or cyclic structure and preferably contain from one to twelve carbon atoms. Typical conventional hydrolyzable esters thus included within the scope of the term and the instant invention are acetate, propionate, 2-methyl propionate, butyrate, valerate, caproate, enanthate, caprylate, benzoate, phenylacetate, diethylacetate, trimethylacetate, 1-butylacetate, cyclohexylacetate, cyclopentylpropionate, admantoate, bicyclo[2.2.2]octyl carboxylate, hemisuccinate, hemiadipate, hemi-$\beta,\beta$-dimethylglutarate.

When one of $R^2$ and $R^3$ is hydrogen and the other is methyl, ethyl or difluoromethyl, the compounds exist as pairs of enantiomorphs. Each enantiomorph or optical isomer and mixtures thereof are included within the scope of the compounds which can be utilized in the methods of the present invention. Such compounds which exist as pairs of enantiomorphs can be administered as racemic mixtures or they can be administered as resolved enantiomorphs. In some instances, one enantiomorph exhibits greater activity than the other corresponding enantiomorph.

The alkanol enantiomorphs can be resolved according to the procedures set forth in U.S. Pat. No. 3,641,161. The aldehyde enantiomorphs are prepared from the corresponding resolved enantiomorph of the starting material, such as by reduction of the corresponding resolved acid, or by oxidation of the corresponding resolved alkanol, preferably the former.

In the broadest sense, the compounds described above are useful as agents for maintaining pregnancy in mammals, for the benefit of the mother and/or the fetus, until termination of the pregnancy is considered, from a medical point of view, to be favorable, or more favorable, for the mother and/or the fetus. It should be understood, however, that in certain instances, for example where parturition has already begun (ie, the mother is experiencing uterine contractions, especially near full term), that administration of the compounds herein described may not maintain the pregnant state for an indefinite period of time. Rather, in such instances, the pregnancy will, most probably, be slightly "prolonged," a factor which may be advantageous to either the mother and/or the fetus.

In particular, the compounds described above are used as agents for delaying the onset of, or for postponing, parturition. As used in this application, the phrase "to delay the onset of parturition" in intended to cover that delay in parturition caused by the administration of the compounds described above at any time before uterine muscle contractions have begun. Thus, it is intended that the aforementioned phrase cover abortion prevention early in pregnancy (ie, before the fetus is "viable") as well as delaying premature parturition, a term which sometimes is used with reference to that premature labor experienced later in the pregnancy when the fetus is considered to be viable. In either case, the agents are administered as prophylatic agents in that such administration tends to prevent the onset of parturition. This administration is particularly useful in the treatment of women having a history of spontaneous abortion, miscarriage or premature delivery (ie, delivery prior to full term). Such administration is also useful where there are clinical indications that the pregnancy might be terminated prior to that time considered favorable to the mother and/or fetus.

With respect to animals, this treatment can also be utilized to synchronize the deliveries from a group of pregnant animals to happen at or about the same time, or to happen at or about a desired time and/or place, when the births can be handled with greater facility.

As used in this application, the phrase "postponing parturition" is intended to cover that delay in parturition caused by the administration of the compounds described above after uterine muscle contractions have begun. The condition of the patient, including the time within the gestation period when the contractions have begun, the severity of the contractions and how long the contractions have taken place will affect the results achieved with the administration of the compounds described above. For example, the effect can be to reduce the intensity and/or the duration of the contractions (the actual act of parturition being "prolonged"), or to stop the contractions altogether. In either case, the effect will be to prolong the gestation period although, depending upon the condition of the patient as described above, the effect may either be slight or, under appropriate circumstances, somewhat greater. Such administration may be to prevent spontaneous abortion, to cause the delivery to be more easily accomplished and/or less painful to the mother, or to occur at a more appropriate time and/or place.

In all cases, administration of the compounds described above, for the purposes set forth herein, should be consistent with best and/or accepted medical (or veterinary) practices so as to maximize the benefits to the mother and the fetus. For example, administration should not be continued so long past full term that the fetus dies in utero.

The compounds described above are known compounds which have previously been administered in the treatment of inflammation, pyrexia and/or pain. The present invention, however, makes the administration of such compounds applicable to pregnant mammals, particularly women, not suffering from such conditions, for the purposes as set forth herein.

In the practice of the methods of the present invention, a therapeutically effective amount of a compound, as defined above, or a pharmaceutical composition containing a compound as defined above, is administered to the pregnant mammal via any of the usual and acceptable methods known in the art. The compound can be administered either singly or in combination with another compound or compounds, as defined above, or other pharmaceutical agents, carriers, adjuvants, etc. Such compounds(s) or compositions can be administered orally, parenterally, or per os, either in the form of solid, semi-solid, or liquid dosage forms. Typically, administration is by a pharmaceutical composition containing the pharmaceutically active compound and one or more pharmaceutical carriers or adjuvants.

The administerable pharmaceutical composition may take the form of oral tablets, vaginal or uterine tablets or suppositories, pills, capsules, liquid solutions, suspensions, or the like, preferably in unit dosage forms suitable for simple administration of precise dosages. Conventional non-toxic solid carriers include, for example, pharmaceutical grades of mannitol, lactose, starch, magnesium stearate, sodium saccharin, talcum, cellulose, glucose, sucrose, magnesium carbonate, and the like. The active compound as defined above may be formulated as suppositories using, for example, polyalkylene glycols, for example, propylene glycol, as the carrier. Liquid pharmaceutically administerable compositions can, for example, be prepared by dissolving, dispersing, etc. an active compound as defined above and optional pharmaceutical adjuvants in a carrier, such as, for example, water, saline, aqueous dextrose, glycerol, ethanol, and the like, to thereby form a solution or suspension. If desired, the pharmaceutical composition to be administered may also contain minor amounts of non-toxic auxiliary substances such as wetting or emulsifing agents, pH buffering agents and the like, for example, sodium acetate, sorbitan monolaurate, triethanolamine oleate, etc. Actual methods of preparing such dosage forms are known, or will be apparent, to those skilled in this art; for example, see Remington's *Pharmaceutical Sciences*, Mack Publishing Company, Easton, Pa., 14th. Edition, 1970. The composition or formulation to be administered will, in any event, contain a quantity of the active compound(s) in an amount effective to delay the onset of parturition or to postpone parturition if uterine contractions have already begun. Generally a daily dose of from 1 mg. to about 50 mg. of the active compound per kilogram of body weight will be administered, with administration being a single daily dose or up to 3 or 4 smaller doses regularly given throughout the day. The aforementioned daily dose is applicable for 1-2-(6-methoxy-2-naphthyl)-1-propanol and other compounds described above having activities or potencies substantially equivalent thereto. The daily dose for compounds having substantially different activities from 1-2-(6-methoxy-2-naphthyl)-1-propanol may differ from the aforementioned range, generally in a manner reflecting the difference in relative activities.

The active compounds (as defined above) utilizable in the methods of the present invention can be prepared accordingly to the methods described in U.S. Pat. Nos. 3,626,012 and 3,641,161, and applications Ser. No. 865,216, filed Oct. 9, 1969, now abandoned. In certain instances, it may be preferred, or desirable, as indicated above, to utilize the biologically active enantiomorph as the agent to be administered. Processes for the isolation of such an enantiomorph are described, for example, in the patents listed above in this paragraph.

DESCRIPTION OF SPECIFIC EMBODIMENTS

The following specific description is given to enable those skilled in this art to more clearly understand and practice the present invention. It should not be considered as a limitation upon the scope of the invention but merely as being illustrative and representative thereof.

EXAMPLE I

A solution is prepared by suspending 6 mg. of 1-2-(6-methoxy-2-naphthyl)-1-propanol per ml. of normal saline solution containing 0.1% Tween 80 (sorbitan monooleate polyoxyethylene; a product of Atlas Chemical Industries, Inc.).

EXAMPLE II

A solution is prepared having 50 mg. of d-2-(6- methoxy-2-naphthyl)propanal suspended per ml. of normal saline solution.

EXAMPLE III–IV

Example II is repeated except dl-2-(6-methoxy-2-naphthyl) propanol and 1-2-(6-methoxy-2-naphthyl)-ethanol are respectively substituted for the d-2-(6-methoxy-2-naphthyl)propanal of Example II.

EXAMPLE V

Example II is repeated except the saline vehicle additionally contains 0.1% Tween 80.

EXAMPLE VI

| Ingredients | Quantity per tablet, mgs. |
| --- | --- |
| 1-2-(6-methoxy-2-naphthyl)-1-propanol | 60 |
| cornstarch | 50 |
| Magnesium stearate | 0.8 |
| lactose | to 300 |
| polyvinylpyrrolidone | 8 |

The above ingredients are thoroughly mixed and pressed into single scored tablets.

EXAMPLE VII

| Ingredients | Quantity per tablet, mgs. |
| --- | --- |
| d-2-(6-methoxy-2-naphthyl)-propanal | 250 |
| cornstarch | 38 |
| Magnesium stearate | 0.76 |
| polyvinylpyrrolidone | 17 |
| lactose | to 380 |

The above ingredients are mixed intimately and pressed into single scored tablets.

EXAMPLE VIII

| Ingredients | Quantity per capsule, mgs. |
| --- | --- |
| d-2-(6-methyl-2-naphthyl)-propanal | 250 |
| cornstarch | 38 |
| lactose | to 380 |

The above ingredients are mixed and introduced into a hard-shell gelatin capsule.

EXAMPLE IX

| Ingredients | Quantity per tablet, mgs. |
| --- | --- |
| 1-2-(6-methyl-2-naphthyl)-1-propanol | 210 |
| cornstarch | 50 |
| microcrystalline cellulose | 120 |

The above ingredients are thoroughly mixed and processed into single scored tablets.

EXAMPLE X

| Ingredients | Quantity per tablet, mgs. |
| --- | --- |
| 1-2-(6-methylthio-2-naphthyl)- | |

-Continued

| Ingredients | Quantity per tablet, mgs. |
| --- | --- |
| 1-propanol | 230 |
| cornstarch (paste) | 50 |
| lactose | 218 |
| magnesium stearate | 2 |

The above ingredients are mixed intimately and pressed into single scored tablets.

EXAMPLE XI

| Ingredients | Quantity per capsule, mgs. |
| --- | --- |
| 1-2-(6-methoxy-2-naphthyl)-ethanol | 200 |
| lactose | 160 |
| cornstarch | 20 |

The above ingredients are mixed and introduced into a No. 1 hard-shell gelatin capsule.

EXAMPLE XII

| Ingredients | Quantity per tablet, mgs. |
| --- | --- |
| d-2-(6-methyl-2-naphthyl)-propanal | 250 |
| sucrose | to 380 |
| polyvinylpyrrolidone | 10 |

The above ingredients are thoroughly mixed and pressed into single scored tablets.

EXAMPLE XIII

| Ingredients | Quantity per tablet, mgs. |
| --- | --- |
| d-2-(6-methoxy-2-naphthyl)-propanal | 300 |
| cornstarch (paste) | 50 |
| magnesium stearate | 2 |
| lactose | 28 |

The above ingredients are mixed intimately and pressed into single scored tablets.

EXAMPLE XIV

| Ingredients | Quantity per capsule, mgs. |
| --- | --- |
| d-2-(6-methylthio-2-naphthyl)-propanal | 250 |
| lactose | 105 |
| cornstarch | 25 |

The above ingredients are mixed and introduced into a No. 1 hard-shell gelatin capsule.

EXAMPLE XV

| Ingredients | Quantity per capsule, mgs. |
| --- | --- |
| d-(6-methyl-2-naphthyl)-ethanal | 300 |
| lactose | 72 |
| magnesium stearate | 8 |

The above ingredients are mixed and introduced into a hard-shell gelatin capsule.

EXAMPLE XVI

An injectable solution is prepared having the following composition:

| Ingredients | Quantity |
| --- | --- |
| d-2-(6-methyl-2-naphthyl)propanal | 2 g. |
| $K_2HPO_4$ buffer (0.4 M solution) | 2 ml. |
| KOH (1N) | 8.6 ml. |
| Water (sterile) | to 20 ml. |

EXAMPLE XVII

A suppository totaling 2.8 grams is prepared having the following composition:

| Ingredients | Quantity |
| --- | --- |
| d-2-(6-methoxy-2-naphthyl)-propanal | 150–500 mg. |
| Witepsol H-15 (triglycerides of saturated vegetable fatty acids; a product of Riches-Nelson, Inc., New York, N.Y.) | balance |

Illustrative compounds represented by the formula set forth above include the dl-racemic mixture, the d-isomer, the l-isomer, and the aforementioned esters or ethers of:

2-(6-methyl-2-naphthyl)-1-propanol,
2-(6-ethyl-2-naphthyl)-1-propanol,
2-(6-propyl-2-naphthyl)-1-propanol,
2-(6-isopropyl-2-naphthyl)-1-propanol,
2-(6-cyclopropyl-2-naphthyl)-1-propanol,
2-(6-methoxy-2-naphthyl)-1-propanol,
2-(6-ethoxy-2-naphthyl)-1-propanol,
2-(6-trifluoromethyl-2-naphthyl)-1-propanol,
2-(6-vinyl-2-naphthyl)-1-propanol,
2-(6-ethynyl-2-naphthyl)-1-propanol,
2-(6-fluoro-2-naphthyl)-1-propanol,
2-(6-chloro-2-naphthyl)-1-propanol,
2-(6-methoxymethyloxy-2-naphthyl)-1-propanol,
2-(6-difluoromethoxy-2-naphthyl)-1-propanol,
2-(6-methylthio-2-naphthyl)-1-propanol,
2-(6-difluoromethylthio-2-naphthyl)-1-propanol,
2-(6-methoxymethylthio-2-napthyl)-1-propanol,
2-(6-methyl-2-naphthyl)ethanol,
2-(6-methoxy-2-naphthyl)ethanol,
2-(6-difluoromethoxy-2-naphthyl)ethanol,
2-(6-methylthio-2-naphthyl)ethanol,
2-(6-chloro-2-naphthyl)ethanol,
2-(6-methyl-2-naphthyl)-1-butanol,
2-(6-methoxy-2-naphthyl)-1-butanol,
2-(6-methylthio-2-naphthyl)-1-butanol,
2-(6-methyl-2-naphthyl)-3,3-difluoro-1-propanol,
2-(6-methoxy-2-naphthyl)-3,3-difluoro-1-propanol,
2-(6-methylthio-2-naphthyl)-3,3-difluoro-1-propanol,
2,2-methylene-2-(6-methyl-2-naphthyl)ethanol,
2,2-ethylene-2-(6-methyl-2-naphthyl)ethanol,
2,2-fluoromethylene-2-(6-methyl-2-naphthyl)ethanol,
2-(6-methyl-2-naphthyl)propanal,
2-(6-ethyl-2-naphthyl)propanal,
2-(6-propyl-2-naphthyl)propanal,
2-(6-isopropyl-2-naphthyl)propanal,
2-(6-cyclopropyl-2-naphthyl)propanal,
2-(6-methoxy-2-naphthyl)propanol,
2-(6-ethoxy-2-naphthyl)propanal,
2-(6-trifluoromethyl-2-naphthyl)propanal,
2-(6-vinyl-2-naphthyl)propanal,
2-(6-ethynyl-2-naphthyl)propanal,
2-(6-fluoro-2-naphthyl)propanal,
2-(6-chloro-2-naphthyl)propanal,
2-(6-methoxymethyloxy-2-naphthyl)propanal,
2-(6-difluoromethoxy-2-naphthyl)propanal,
2-(6-methylthio-2-naphthyl)propanal,
2-(6-difluoromethylthio-2-naphthyl)propanal,
2-(6-methoxymethylthio-2-naphthyl)propanal,
2-(6-methyl-2-naphthyl)ethanal,
2-(6-methoxy-2-naphthyl)ethanal,
2-(6-difluoromethoxy-2-naphthyl)ethanal,
2-(6-methylthio-2-naphthyl)ethanal,
2-(6-chloro-2-naphthyl)ethanal,
2-(6-methyl-2-naphthyl)-3,3-difluoropropanal,
2-(6-methyl-2-naphthyl)butanal,
1,1-ethylenedioxy-2-(6-methyl-2-naphthyl)propane, and
1,1-(1,2-propylenedioxy)-2-(6-methyl-2-naphthyl)propane.

While the present invention has been described with reference to specific embodiments thereof, it should be understood by those skilled in this art that various changes may be made and equivalents may be substituted without departing from the true spirit and scope of the invention. In addition, many modifications may be made to adapt a particular situation, material or composition of matter, process, process step or steps, or then-present objective to the spirit of this invention without departing from its essential teachings.

What is claimed is:

1. A method comprising administering to a pregnant mammal a compound selected from the group of compounds represented by the formula:

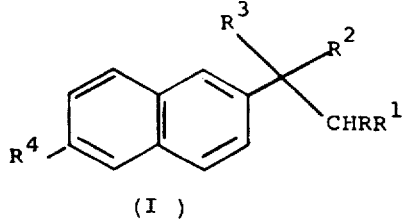

(I)

wherein, R is hydrogen and $R^1$ is hydroxy or a conventional hydrolyzable ester thereof; or R and $R^1$ together form =O;

one of $R^2$ and $R^3$ is hydrogen, the other is hydrogen, methyl, ethyl or difluoromethyl; or $R^2$ and $R^3$ taken together are methylene, halomethylene or ethylene; and $R^4$ is alkyl, cycloalkyl, trifluoromethyl, vinyl, ethynyl, fluoro, chloro, alkoxy, alkoxymethyloxy, difluoromethoxy, alkylthio, alkoxymethylthio or difluoromethylthio;

said compound being administered in a therapeutically effective amount adapted to delay the onset of parturition or to postpone parturition.

2. The method of claim 1 wherein said pregnant mammal is a woman who is not suffering from inflammation, pyrexia, or pain, said compound being administered in a therapeutically effective amount adapted to delay the onset of parturition.

3. The method of claim 2 wherein said pregnant woman has a history of spontaneous abortion, miscarriage, or premature delivery, said abortion, miscarriage or premature delivery having previously commenced prior to the time for normal parturition at or about full term.

4. The method of claim 2 wherein said compound is 1-2-(6-methoxy-2-naphthyl)-1-propanol.

5. The method of claim 2 wherein said compound is 1-2-(6-methyl-2-naphthyl)-1-propanol.

6. The method of claim 2 wherein said compound is d-2-(6-methoxy-2-naphthyl)propanal.

7. The method of claim 1 wherein said pregnant mammal is a woman not suffering from inflammation, pyrexia or nonparturition-causing pain but who is experiencing uterine muscle contractions, said compound being administered in a therapeutically effective amount adapted to reduce the intensity or duration of the uterine muscle contractions, or stop the uterine muscle contractions altogether, whereby termination of the pregnancy is postponed from the time it otherwise would have happened.

8. The method of claim 7 wherein said compound is 1-2-(6-methoxy-2-naphthyl)-1-propanol.

9. The method of claim 7 wherein said compound is 1-2-(6-methyl-2-naphthyl)-1-propanol.

10. The method of claim 7 wherein said compound is d-2-(6-methoxy-2-naphthyl)propanal.

* * * * *